(No Model.)
T. W. CAPEN.
Reversing Mechanism.
No. 237,675.          Patented Feb. 15, 1881.
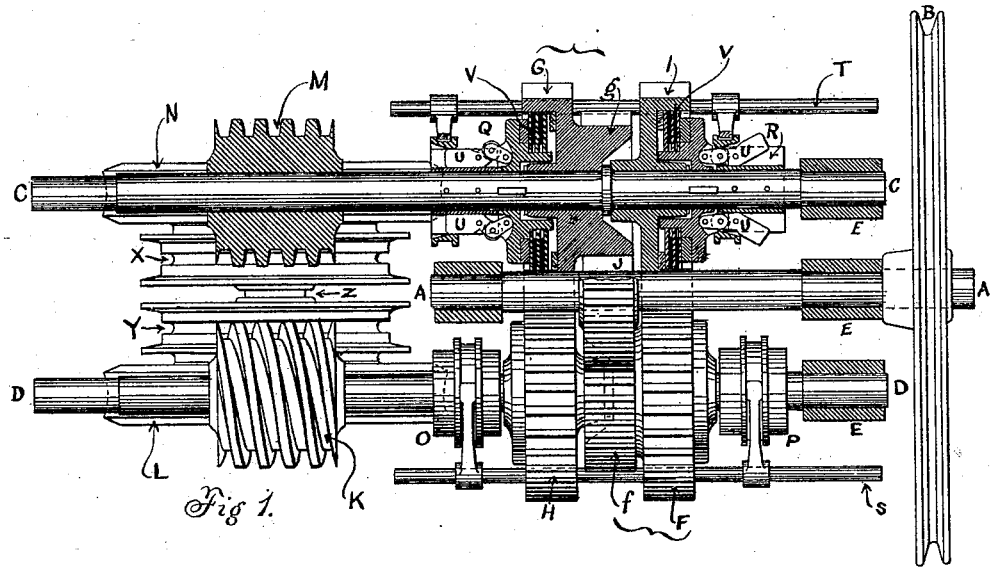

UNITED STATES PATENT OFFICE.

THOMAS W. CAPEN, OF STAMFORD, CONNECTICUT, ASSIGNOR TO THE YALE LOCK MANUFACTURING COMPANY, OF SAME PLACE.

REVERSING MECHANISM.

SPECIFICATION forming part of Letters Patent No. 237,675, dated February 15, 1881.

Application filed October 28, 1880. (No model.)

*To all whom it may concern:*

Be it known that I, THOMAS WELLS CAPEN, of Stamford, county of Fairfield, and State of Connecticut, have invented a certain new and Improved Reversing Mechanism; and I do hereby declare that the following is a full, clear, and exact description of the invention, that will enable others skilled in the art to which it appertains to make and use the same.

My invention relates to mechanism for reversing the motion of shafts for the transmission of power. As represented in the drawings, it is designed particularly for use in connection with a crane of either the jib or traveling types. Its purpose is to utilize power, transmitted by a wire rope or belt to the wheel B, for hauling in or paying out chain or rope from either one or both of two chain wheels or drums, either independently or simultaneously.

The following is a description of the details of my arrangement, reference being had to the accompanying drawings and the letters of reference indicated thereon.

Figure 1 is a plan or top view of the mechanism, in which A is the main or driving shaft of the mechanism, to which rotary motion is communicated in one direction constantly by means of a rope or belt on the periphery of the wheel B. Fig. 2 is an elevation or side view of the mechanism, and Fig. 3 an end view of the three shafts and their connecting gears.

On each side of the shaft A are two parallel shafts, C and D. The several shafts run in suitable boxes or bearings E E E.

On the shaft D are two spur-wheels, F and H, and on the shaft C two corresponding spur-wheels, G and I. Each of these four wheels can revolve freely on the shaft or the shaft within the wheels without any motion being communicated from one to the other.

Cast in one piece with the wheel F is the pinion *f*, and with the wheel G the pinion *g*.

On the driving-shaft A is the spur-wheel J, which is always in gear with the pinions *f* and *g*.

By reference to Fig. 3, it will be seen also that the spur-wheels F and I are always engaged together, and in like manner the spur-wheels G and H, whence it follows that wheels F and I are always running in contrary directions, as also are wheels G and H.

Within the wheels F, G, H, and I are a series of disks, constituting a brake or clutch on the principle described in the Letters Patent granted to Thomas A. Weston March 3, 1868, No. 75,227.

O, P, Q, and R are four sliding hubs or followers, keyed or pinned to the shafts C and D, so as always to rotate with them, but capable of a moderate longitudinal motion on said shafts.

The form of clutch thus indicated is that which I prefer to use; but obviously any other of the well-known forms of disengaging-clutches could be utilized.

For imparting the requisite end pressure to cause the engagement of the several clutches I prefer to use the toggle device for which Letters Patent were granted to me June 22, 1880, No. 229,092, for the reason that this device relieves the clutches and shafts from all end pressure; but obviously other known devices for this purpose could be substituted.

The shafts C and D carry each, respectively, the worms M and K, which, in turn, engage with and drive the worm-wheels N and L. These worm-wheels revolve freely on the fixed shaft Z. Bolted rigidly to the worm-wheel L is the chain wheel, barrel, or drum Y, and to the worm-wheel N a corresponding chain wheel, barrel, or drum, X. When in use a chain or rope is passed around each of the wheels or drums X and Y, which latter, by means of pockets for chain, or grooves for rope, is capable, by its rotation, of hauling in or winding up such chain or rope, and thereby effecting the several operations required in a crane, such as hoisting, lowering, and traversing in either direction.

In order to effect the several operations of a crane it is necessary that the mechanism should be capable of hauling in or paying out either one of two separate chains or ropes independently of the other, and also capable of paying out both of said ropes simultaneously, or of hauling them in simultaneously; also, that it should be capable of paying out the one and hauling in the other simultaneously and at equal speeds. To effect all of these several operations conveniently and quickly, and to utilize therein power taken from a single source and moving always in one direction, is the object of my invention.

The operation of the mechanism is as follows: Assuming the shaft A to rotate continuously in one direction and at the proper speed, it is obvious that the spur-wheel J will cause the pinions $f$ and $g$ to rotate constantly in the opposite direction, as indicated by the full arrows in Fig. 3. The pinion $f$ carries with it the wheel F, (with which it is cast in one piece,) and the latter, gearing with the wheel I, causes it to rotate in the opposite direction from wheel F, as shown by the dotted arrow in Fig. 3. In like manner the pinion $g$ carries the wheel G, which, in turn, gears with the wheel H and drives the latter in the direction opposite to that of G. It will thus be seen that with the shaft A and wheel J running in one direction—say to the left—the pinions $f$ and $g$ and the wheels F and G will run in the contrary direction—that is, to the right—while the motion of the wheels I and H will be reversed, so that the latter run to the left, like the shaft A. It will thus be seen that on each of the shafts C and D, I have two wheels in constant revolution, one of which turns to the right and the other to the left, but all of which run loose on their shafts. Now, by moving either or both of the sliding bars S and T longitudinally, I cause the engagement of one or more of the sliding hubs or followers O, P, Q, and R with its corresponding wheel F G H I, through the instrumentality of the friction-disks V V and the toggles U U, as fully explained in the two Letters Patent above referred to. I am thus enabled at pleasure to cause the rotation of the shaft C either to the right or to the left, and of the shaft D in like manner to the right or to the left, or I can simultaneously cause both shafts to rotate to the right, or both to the left, or one to the right and the other to the left. The several motions thus effected are communicated, through the two worms and worm-wheels, to the chain wheels or drums X and Y, causing corresponding motions of paying out or taking in the chains or ropes attached thereto. By a suitable system of levers or rods the motions of the sliding bars S and T can be effected from any point where it is desired to have the operator stand.

The essential conditions of a mechanism for the purpose named are, first, a shaft revolving continuously in one direction, and, second, two other shafts driven by the first, but capable, at will, of motion in either direction independently of each other. These conditions I obtain in the simplest and most direct manner, without the use of bevel-gears, and with the greatest compactness of construction.

Having thus described my invention, what I claim as new, and desire to secure by Letters Patent, is—

1. The combination, with the shaft A, adapted to rotate continuously in one direction, of the shafts C and D, adapted to rotate independently of each other and of the shaft A, and intermediate connecting mechanism, whereby one or both of said shafts C and D may be rotated in the direction with, or in a direction opposite to, the shaft A, substantially as described.

2. The combination, with the shafts A, C, and D, of the following elements, viz: First, the driving-pinion J, moving continuously in one direction; second, the driven pinions $f$ and $g$, moving continously in a direction opposite to that of J; third, the gear-wheels G and F, driving, in a direction opposite to their own, the wheels H and I respectively; and, fourth, suitable clutches for connecting and disconnecting the wheels F, G, H, and I with the shafts C and D, whereby the latter may be caused to rotate either independently or simultaneously in either or in contrary directions.

In witness whereof I have hereunto subscribed my name.

THOS. W. CAPEN.

Witnesses:
HARRY R. CORNELIUS,
GEO. H. BOTTS.